(12) United States Patent
Maltese et al.

(10) Patent No.: US 10,404,931 B2
(45) Date of Patent: Sep. 3, 2019

(54) METHOD FOR DETECTING DEFECTIVE PIXELS

(71) Applicant: SAFRAN ELECTRONICS & DEFENSE SAS, Boulogne Billancourt (FR)

(72) Inventors: Dominique Maltese, Boulogne Billancourt (FR); Mathieu Oudinot, Boulogne Billancourt (FR); Quentin Perdriau, Boulogne Billancourt (FR); Thomas Devichi, Boulogne Billancourt (FR)

(73) Assignee: SAFRAN ELECTRONICS & DEFENSE SAS, Boulogne Billancourt (FR)

( * ) Notice: Subject to any disclaimer, the term of this patent is extended or adjusted under 35 U.S.C. 154(b) by 0 days.

(21) Appl. No.: 15/520,634

(22) PCT Filed: Nov. 5, 2015

(86) PCT No.: PCT/EP2015/075838
§ 371 (c)(1),
(2) Date: Apr. 20, 2017

(87) PCT Pub. No.: WO2016/071461
PCT Pub. Date: May 12, 2016

(65) Prior Publication Data
US 2017/0318245 A1 Nov. 2, 2017

(30) Foreign Application Priority Data
Nov. 7, 2014 (FR) ...................................... 14 60762

(51) Int. Cl.
*H04N 5/367* (2011.01)

(52) U.S. Cl.
CPC ........... *H04N 5/367* (2013.01); *H04N 5/3675* (2013.01)

(58) Field of Classification Search
CPC ...................................................... H04N 5/367
USPC ........................................................ 348/246
See application file for complete search history.

(56) References Cited

U.S. PATENT DOCUMENTS

| 6,763,084 B2 * | 7/2004 | Boehm ................... A61B 6/583 348/E5.081 |
| 2003/0146975 A1 | 8/2003 | Joung et al. |
| 2010/0141810 A1 | 6/2010 | Wang et al. |

OTHER PUBLICATIONS

Jan. 18, 2016 Search Report issued in International Patent Application No. PCT/EP2015/075838.

* cited by examiner

*Primary Examiner* — Joel W Fosselman
(74) *Attorney, Agent, or Firm* — Oliff PLC; R. Brian Drozd (57) ABSTRACT

A defective-pixel detection method included in an image-processing procedure, including a pixel-processing procedure applied to pixels of an image supplied by an image sensor. Each pixel is associated with a classification value representing a state of said pixel. The method includes, for each pixel: applying the pixel-processing procedure; analyzing a result of the pixel-processing procedure; in the event of obtaining an unusual result representing a defect on a photosite of the image sensor that supplied said pixel, incrementing a number of detections of an unusual result for said pixel; and associating said pixel with a classification value representing a defective pixel when said number reaches a first threshold.

12 Claims, 4 Drawing Sheets

METHOD FOR DETECTING DEFECTIVE PIXELS

The present invention relates to a method for detecting defective pixels, a device able to detect defective pixels and a system comprising said device. The invention also relates to a method for determining a reliability level of at least one data item output from an image processing procedure using the defective-pixel detection method.

Optronic systems are known, such as a photographic apparatus, a video camera, binoculars, a telescope, a viewfinder or a gyro-stabilised ball (GSB) equipping an airborne observation system. These optronic systems comprise image-acquisition devices comprising at least one image sensor able to acquire images in various frequency ranges such as a frequency range corresponding to frequencies perceptible to a human eye or a frequency range situated in the infrared.

An image sensor provides images in the form of a grid of pixels. An image sensor consists of a grid of active elements, referred to as photosites, consisting for example of photodiodes, each photodiode being able to convert an incident light beam into an electrical signal. Each pixel of an image corresponds to a photosite on the image sensor. Some photosites of the image sensor frequently have a defect, making this photosite unsuitable for providing a valid pixel value. These defects may be manufacturing defects making these photosites definitively unable to provide valid pixel values, or temporary defects occurring randomly. A manufacturing defect can be detected by a procedure of checking the image sensors implemented following manufacture. An image sensor comprising an excessively large number of defective photosites, i.e. providing an excessively great number of non-valid pixels, referred to as defective pixels, per image, is then rejected. An image sensor having an acceptable number of defective photosites, i.e. providing an acceptable number of defective pixels per image, is kept. The position of each defective pixel provided by a photosite of the defective image sensor can then be listed. The procedure for checking the sensors after manufacture is, on the other hand, unsuited to temporary defects occurring randomly since, by definition, these defects may arise at any moment, including well after manufacture.

Moreover, optronic systems in general comprise one or more image processing modules that can be used by a dedicated device or in software form. Image processing modules may offer many functionalities such as for example a functionality of improving a rendering of the images acquired by the image sensor, a functionality of detecting objects in one or more images, or a functionality of following objects in a sequence of successive images. An image processing module is then able to provide output data, such as for example improved images, coordinates of an object detected, or a speed and direction of movement of an object being followed. These output data may then be used for display on a display device such as for example a screen, a head-up display, a viewfinder eyepiece or a binocular eyepiece, or smartglasses, and/or for saving in a storage device and/or for triggering an alarm intended for an operator.

An effective image-processing module must provide output data having a high or even maximum level of reliability. An output data item having a low reliability level may in fact cause faulty interpretation of a content of an image or an unjustified alarm. The reliability level of output data of an image-processing module depends greatly on the quality of the images to which the processing operations are applied. The quality of an image depends on a plurality of factors, one of these factors being the number of defective pixels contained in the image. It is therefore important, in order to make each data item output from an optronic system reliable, to detect defective pixels so that the presence thereof is taken into account by the image processing module.

Optronic systems comprising a module for detecting defective pixels acting between an acquisition device and image-processing module are known. A module for detecting defective pixels is an image-processing module dedicated to detection of defective pixels in an image. The defective pixel detection module receives images from the image acquisition device and supplies, to the image-processing module, information representing defective pixels detected in the images. In this way, the image-processing module can take into account the defective pixels detected in order to monitor the reliability level of the data output from the image processing module.

However, integrating a defective-pixel detection module in an optronic system increases the manufacturing cost and complexity of use of the optronic system. In addition, the defective-pixel detection module and the image-processing module generally use redundant procedures. For example, it is usual for each of the modules to have to implement a procedure of running through pixels in an image. Integrating a defective-pixel detection module separate from the image-processing module does not make it possible to rationalise the implementation of these redundant procedures and to avoid implementing them in the two modules. For example, the procedure for running through pixels of the image is generally implemented firstly in the defective-pixel detection module and secondly in the image-processing module.

The objective of the invention is to solve the problems mentioned above. The invention aims in particular to propose a method and device able to detect defective pixels, the method creating synergy between a defective-pixel detection module and the image-processing module. The invention aims in particular for the results of procedures implemented in the image-processing module to be able to be reused when the defective pixel detection module is used so as to obtain a reduction in the computing cost of using the defective-pixel detection module. Moreover, the invention aims to provide a method for determining or optimising a reliability level of data output from the image-processing module using the method able to detect defective pixels according to the invention.

To this end, according to a first aspect of the present invention, the present invention relates to a method for detecting defective pixels included in an image-processing procedure comprising a pixel-processing procedure, the pixel-processing procedure being applied to pixels of at least one image issuing from an image sensor, each pixel corresponding to an active element of the image sensor, referred to as a photosite, able to convert an incident light beam into an electrical signal, each pixel being associated with a classification value representing a state of said pixel. The method comprises the following step: applying a combined pixel-processing and defective-pixel detection procedure to each pixel of an image, comprising, for each pixel, applying the pixel-processing procedure to said pixel; analysing a result of the pixel-processing procedure; in the event of obtaining an unusual result representing a defect on a photosite of the image sensor that supplied said pixel, incrementing a variable representing a number of detections of an unusual result for said pixel; and associating said pixel with a classification value representing a defective pixel when said variable reaches a first threshold representing a maximum number of unusual results.

In this way, the results of the pixel-processing procedure are reused for detecting defective pixels.

According to one embodiment, the method is applied to a sequence of successive images issuing from the image sensor and the first threshold is a maximum number of unusual results acceptable over a period of time corresponding to a number of images equal to a second threshold.

According to one embodiment, when a pixel of a first image is associated with a classification value representing a defective pixel, said pixel is considered to be defective as long as the pixel-processing procedure does not, for said pixel, give a non-unusual result, not representing a defect on a photosite of the image sensor that supplied said pixel, during a period of time corresponding to a number of successive images equal to a third threshold.

In this way, it is ensured that a pixel is indeed in a stable state before deciding that said pixel is no longer in a defective state.

According to one embodiment, a procedure of periodic re-initialisation to a classification value representing a non-defective pixel is applied to the classification value associated with each pixel, the periodic re-initialisation taking place with a predefined period corresponding to a number of images equal to a fourth threshold.

According to a second aspect of the present invention, the present invention relates to a method for determining a reliability level of at least one data item output from an image processing procedure, each output data item being obtained from at least one result of a pixel-processing procedure included in the image-processing procedure. The method comprises the following steps: applying the defective-pixel detection method according to the first aspect; determining the reliability level of each output data item according to the classification value associated with each pixel involved in a result of the pixel-processing procedure making it possible to obtain said output data item.

According to one embodiment, the method further comprises, for each output data item, a step of deciding to use or replace said output data item according to the reliability level of said output data item, an output data item being used for a display of said output data item and/or saving of said output data item and/or triggering of an alarm corresponding to said output data item.

According to a third aspect of the present invention, the present invention relates to a device able to determine a reliability level of a data item output from an image-processing device comprising a pixel-processing module able to process pixels of at least one image issuing from an image sensor, each pixel corresponding to an active element of the image sensor, referred to as a photosite, able to convert an incident light beam into an electrical signal. The device comprises the following means: means for obtaining a result of a use of the pixel-processing module on a pixel; means for identifying an unusual result from the image-processing module, representing a defect on a photosite of the image sensor that supplied a pixel, means for incrementing a variable representing a number of unusual results obtained for a pixel; means for associating a pixel with a classification value representing a defective pixel when said variable reaches a first threshold representing an acceptable maximum number of unusual results; means for determining the reliability level of each output data item according to the classification value associated with each pixel involved in a result of the pixel-processing procedure making it possible to obtain said output data item.

According to a fourth aspect of the present invention, the present invention relates to an image processing device comprising a pixel processing module able to process pixels of at least one image issuing from an image sensor and a device according to the third aspect.

According to a fifth aspect of the present invention, the present invention relates to an optronic system comprising an image acquisition system provided with an image sensor, an image processing device according to the fourth aspect and an image-display and/or image-storage device.

According to a sixth aspect of the invention, the invention relates to a computer program product, characterised in that it contains instructions for the implementation, by a device, of the method according the first aspect, when said program is executed by a processor of said device.

According to a seventh aspect of the invention, the invention relates to storage means, characterised in that they store a computer program containing instructions for the implementation, by a device, of the method according to the first aspect when said program is executed by a processor of said device.

The features of the invention mentioned above, as well as others, will emerge more clearly from a reading of the following description of an example embodiment, said description being given in relation to the accompanying drawings, among which.

The description detailed below sets out to describe various embodiments of the present invention in a context of an optronic system able to acquire images and to detect and monitor objects in these images. In this context, the invention allows in particular, when an object has been detected and is followed by the image-processing module, to confirm that this object is indeed a real object rather than an object detected because of the presence of defective pixels. The principles of the present invention do however apply in a wider context of an optronic system comprising an image-acquisition device and an image-processing module. For example, the present invention applies to a photographic apparatus, a video camera, a telescope and digital binoculars. In this wider context, the invention offers an effective solution enabling, for example, the optronic system to apply a post processing to images in order to attenuate any degradation caused by defective pixels in an image.

Figure 5:
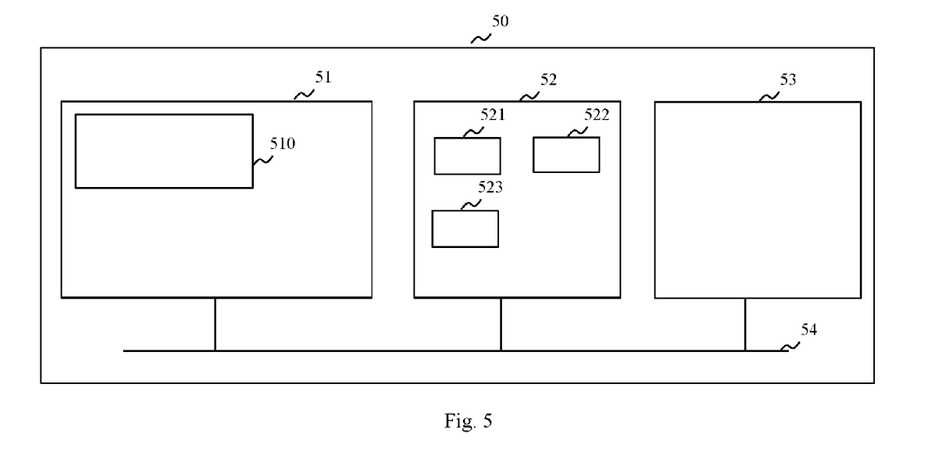
FIG. 5 depicts schematically an example an optronic system comprising an image-processing device able to implement the invention.

FIG. 5 depicts schematically an example of an optronic system 50 comprising an image-processing device able to implement the invention. The optronic system 50 comprises an image-acquisition device 51 comprising an image sensor 510. Moreover, the optronic system 50 comprises an image-processing module 52 and a display device 53. A communication bus 54 enables the image-acquisition device 51, the image-processing module 52 and the display device 53 to communicate. For example, the communication bus 54 enables the image-acquisition device 51 to supply images to the image-processing module 52. In addition, the communication bus 54 enables the image-processing module 52 to supply output data to the display device 53, such as for example images including an object being followed, coordinates of an object being followed or alarm messages following the detection of an object.

In the example in FIG. 5, the image-processing module 52 comprises a pixel-processing module 521, a defective-pixel detection module 522 and an output-data processing module 523.

The pixel-processing module 521 is able to apply at least one processing to each pixel on the image supplied by the image-acquisition device 51. The pixel-processing module 521 can for example apply the following processing operations to a pixel of an image: filtering of the pixel to attenuate or suppress any acquisition noise in the image; filtering of the pixel to improve or detect contours of objects in the image; application of an optical-flow method for determining a movement of the pixel, a movement being defined for example by a movement amplitude and/or a movement direction and/or a movement speed.

As described hereinafter in relation to FIGS. 3A, 3B and 4, the defective-pixel detection module 522 is able to detect defective pixels by relying on results from the pixel-processing module 521 and attributing a classification value to each pixel according to the results of the detection. Moreover, the defective-pixel detection module 522 is able to determine a reliability level for each output data item issuing from image-processing procedures used by the image-processing module 52 from the classification values of the pixels. The output-data processing module 523 is able to apply a processing to the output data issuing from image-processing procedures used by the image-processing module 52 according to the reliability level of each output data item.

Hereinafter we distinguish two types of output data: output data, referred to as intermediate output data, issuing from image-processing procedures used by the image-processing module 52; output data, referred to as final output data, issuing from an application of a processing to the intermediate output data items by the output data processing module 523.

In one embodiment, the image-processing module 52, the pixel-processing module 521, the defective-pixel detection module 522 and the output-data processing module 523 are software modules.

In one embodiment, the image-processing module 52 is used by a device, referred to as the image-processing device, using the pixel-processing module 521, the defective-pixel processing module 522 and the output-data processing module 523.

In one embodiment, the image-processing module 52 is used by a device, referred to as the image-processing device, comprising a device, referred to as the defective-pixel detection device, using the defective-pixel detection module 522, the pixel-processing module 521 and the output-data processing module 523 being used either by a device or by a separate software module.

In one embodiment, the optronic device 50 further comprises a communication device (not shown) for communicating the output data from the image-processing module 52 to a distant device (not shown), and a storage device (not shown) for storing the output data from the image-processing module 52.

In one embodiment, when the optronic system 50 is able to detect and follow objects, the image processing module 52 further comprises an object detection and following module (not shown) that uses results from the pixel-processing module 521 to detect and follow objects in images. For example, the object detection and following module uses images resulting from a filtering improving and/or detecting contours in order to seek contours of objects in said images and to match objects in a plurality of successive images. In addition, the object detection and monitoring module uses movement information associated with each pixel obtained by the pixel-processing module 521 in order to determine movements of each object detected. The intermediate output data are then the output data from the object detection and monitoring module and consist of coordinates of at least one detected object and movement information on each detected object.

Figure 6:
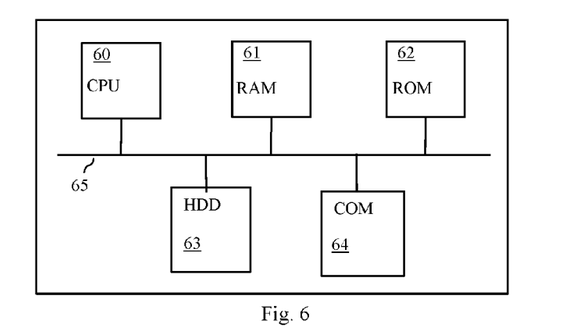
FIG. 6 illustrates schematically an example of hardware architecture of a device able to implement the invention.

FIG. 6 illustrates schematically an example of hardware architecture of a device able to implement the image-processing method according to the invention. In the example in FIG. 6, the hardware architecture is that of the defective-pixel detection device. However, this example of hardware architecture could also be that of the image-processing device, when the image-processing device does not comprise any specific device dedicated to use of the defective-pixel detection module 522 but has means for using the defective-pixel detection module 522.

According to the example of hardware architecture shown in FIG. 6, the defective-pixel detection device then comprises, connected by a communication bus 65: a processor or CPU (central processing unit) 60; a random access memory RAM 61, a read-only memory ROM 62, a storage unit such as a hard disc HDD and/or a storage medium reader, such as an SD (secure digital) card reader 63; at least one communication interface 64 enabling the defective-pixel detection device to communicate with modules of the image-processing device such as for example the pixel-processing module 521, the output-data processing module 523 and the object detection and following module, when the latter is present. The storage unit 63 can temporarily store intermediate output data, for example the time for determining a reliability level of each output data item.

The processor 60 is capable of executing instructions loaded in the RAM 61 from the ROM 62, from an external memory (not shown), from a storage medium (such as an SD card) or from a communication network. When the defective-pixel device is powered up, the processor 60 is capable of reading instructions from the RAM 61 and executing them. These instructions form a computer program causing the implementation, by the processor 60, of all or some of the algorithms and steps described in relation to FIGS. 3A, 3B and 4.

Figure 3A:
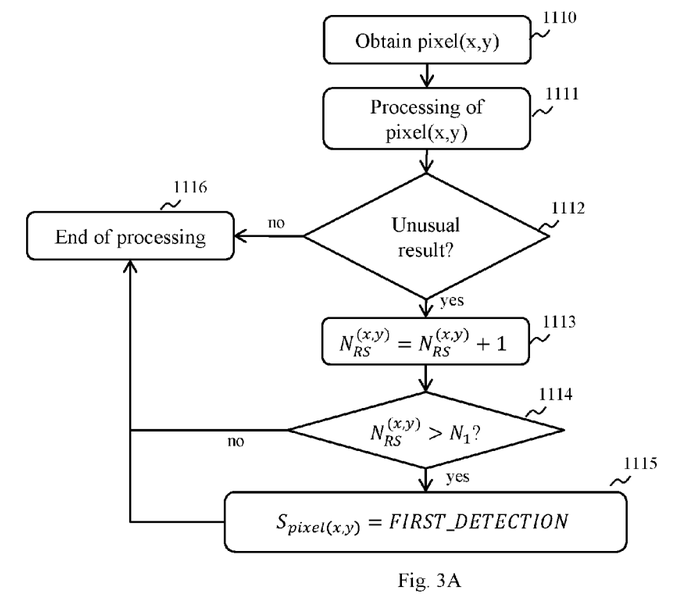
FIG. 3A illustrates schematically an example of a combined pixel-processing and defective-pixel detection procedure included in the image-processing procedure able to implement the invention.
Figure 3B:
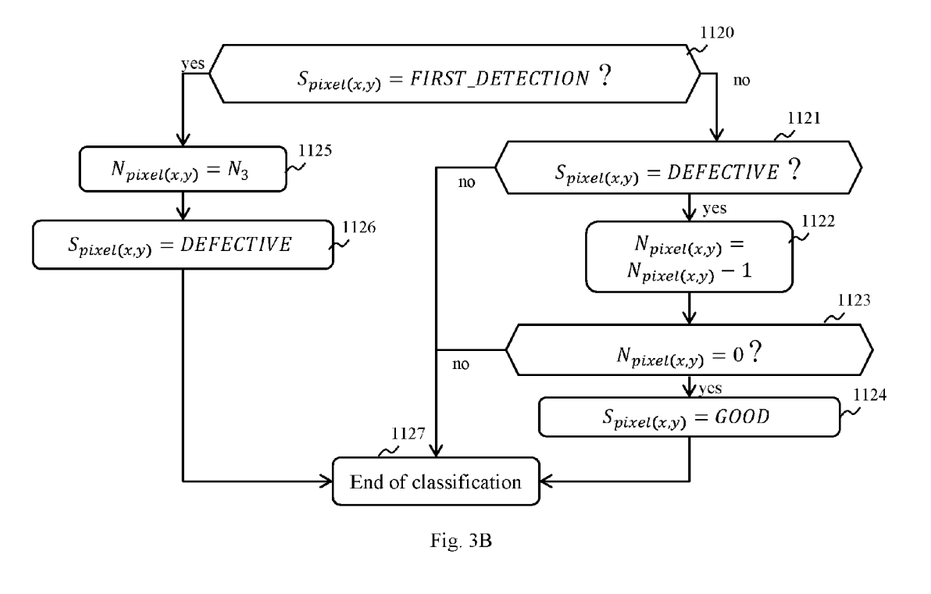
FIG. 3B depicts schematically an example of a pixel-classification procedure included in the image-processing procedure able to implement the invention.
Figure 4:
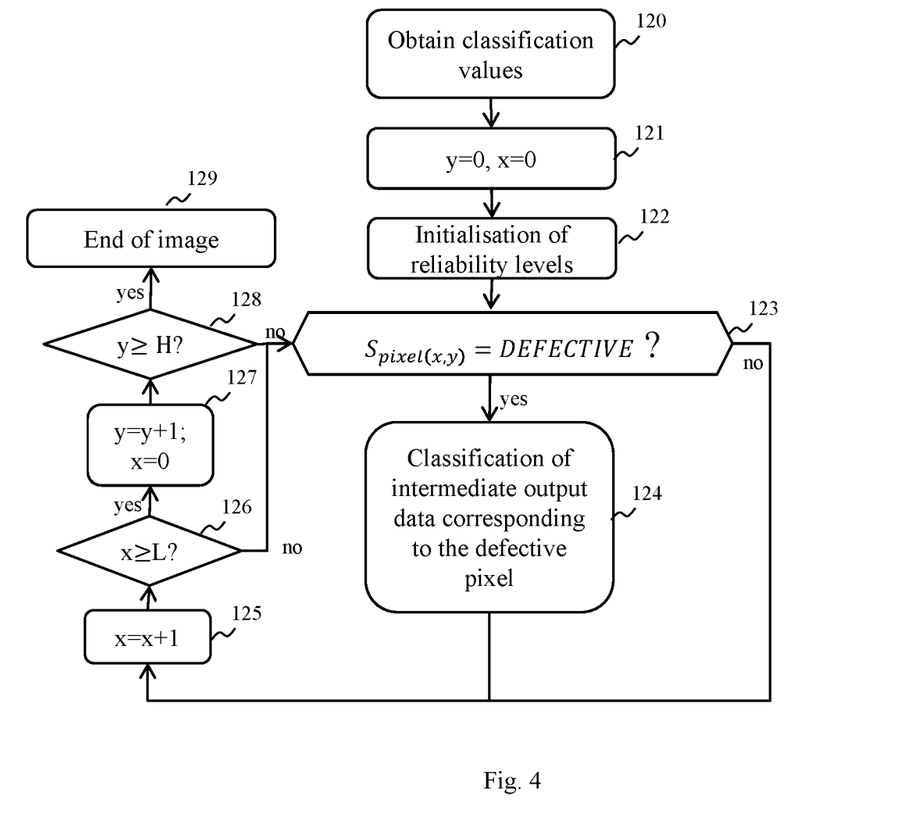
FIG. 4 depicts schematically an example of a results-synthesis procedure using the image-processing procedure able to implement the invention.

All or some of the algorithms and steps described in relation to FIGS. 3A, 3B and 4 can be implemented in software form by the execution of a set of instructions by a programmable machine, for example a DSP (digital signal processor) or a microcontroller, or be implemented in hardware form by a device, a machine or a dedicated component, for example an FPGA (field-programmable gate array) or an ASIC (application-specific integrated circuit).

Figure 1:
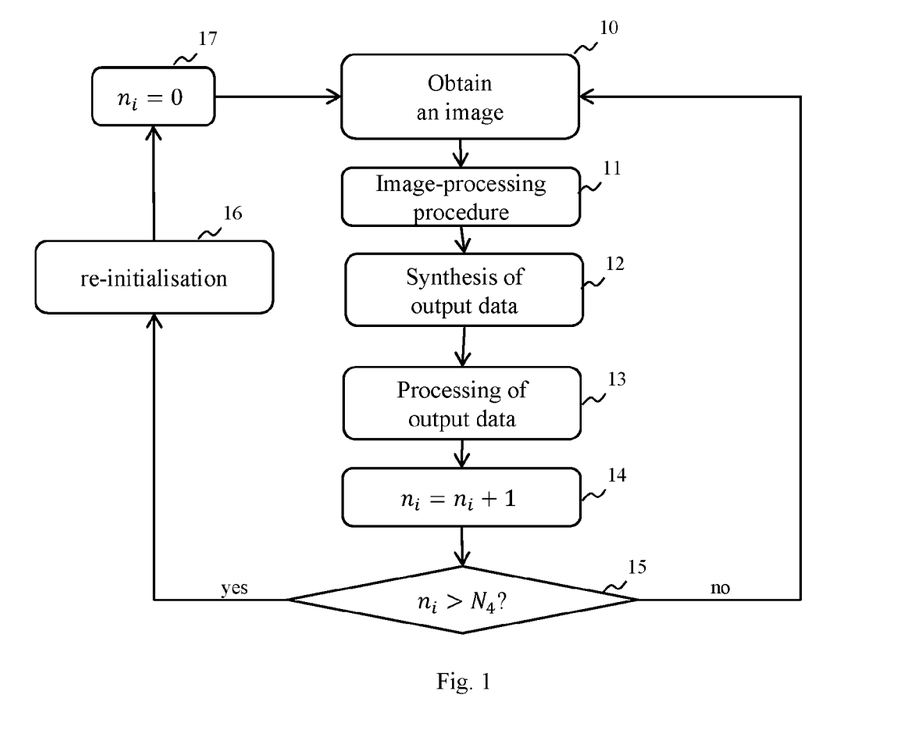
FIG. 1 depicts schematically an example of a method used by an image-processing module able to implement the invention.

FIG. 1 shows schematically an example of a method used by the image-processing module 52.

In a step 10, the image processing module 52 receives an image, referred to as the current image, from the image-acquisition device 51. When the image received is a first image obtained after the powering up of the optronic system, the image processing module 52 associates a plurality of variables of each pixel and initialises these variables. The plurality of variables comprise a first variable, which we call the classification value, able to store a classification value of a pixel. The classification value represents a state of the photosite of the image sensor 510 that supplied said pixel. As described hereinafter, a pixel can be associated with three classification values: a classification value called "good pixel" indicating that the photosite of the image sensor 510 that supplied the pixel is functioning correctly and supplies a valid pixel; a classification value called "defective pixel" indicating that the photosite of the image sensor 510 that supplied the pixel is defective and supplies a defective pixel; a classification value called "first detection", which is a transient value indicating firstly that the pixel-processing module 521 has just given a result, referred to as an unusual result, for the pixel, and secondly that the photosite of the image sensor 510 that supplied the pixel is defective and supplies a defective pixel. When step 10 is applied to the first image, the classification value of each pixel is initialised to "good pixel". Moreover, when step 10 is applied to the first image, a second variable $N_{RS}^{(x,y)}$ and a third variable $N_{pixel(x,y)}$ of said plurality, which is explained hereinafter in relation to FIGS. 3A and 3B, are associated with each pixel and are initialised to the value "0".

In a step 11, the image processing module 52 applies an image-processing procedure, which is detailed hereinafter in relation to FIGS. 3A and 3B, to the current image. During the image-processing procedure, the variables in the plurality of variables associated with each pixel are updated.

The image processing procedure also allows to obtain intermediate output data. When the optronic system 50 is able to acquire images and to detect and follow objects in these images, the intermediate output data are for example: the pixels of an image issuing from filterings intended to attenuate an acquisition noise and/or to improve and/or detect contours in images supplied by the image-acquisition device 51; information representing a detected and followed object, such as for example information representing a position of the object in the image, information representing an amplitude of movement of the object, information representing a speed of movement of the object and information representing a direction movement of the object. These intermediate output data are supplied by the pixel-processing module 521 and/or the object-detection and following module included in the image-processing module.

In a step 12, the defective-pixel detection module 522 of the image-processing module 52 determines a reliability level for each intermediate output data item in accordance with an output-data synthesis method described in relation to FIG. 4.

In a step 13, the output-data processing module 523 of the image-processing module 52 applies a processing to the intermediate output data according to their reliability level, which allows to obtain final output data. In one embodiment of step 13, the processing consists of deciding whether an intermediate output data item must be used or not. An intermediate output data item that can be used becomes a final output data item. For example, the decision may consist of not transmitting, to the display device 53 or to the storage device, an intermediate output data item associated with a reliability level below a predefined threshold. In one embodiment of step 13, the processing consists of not transmitting, to the display device 53 or to the storage device, an intermediate output data item associated with a reliability level indicating that at least one defective pixel has been used for obtaining said intermediate output data item.

In one embodiment of step 13, the processing consists of replacing the intermediate output data item with a corrected output data item, the corrected output data item being used subsequently as the final output data item. If for example an intermediate output data item is a filtered pixel value issuing from a defective pixel, the filtered pixel value issuing from a defective pixel may be replaced by a pixel value obtained from valid pixels adjacent to the defective pixel.

In a step 14, following the processing of an image, a value of a variable $n_i$ making it possible to count a number of images processed by the image-processing module 52 is incremented by one unit. In a step 15, the value of the variable $n_i$ is compared with a re-initialisation threshold corresponding to a number of images $N_4$. The number of images $N_4$ allows to monitor a period of re-initialisation of the classification value associated with each pixel. In this way, a pixel supplied by a photosite of the image sensor 510 passing temporarily into a defective state can be associated with the classification value "good pixel" when said photosite once again goes into a correct functioning state. If the variable $n_i$ is greater that the number of images $N_4$, step 15 is followed by a step 16 of periodic re-initialisation during which the classification value associated with each pixel of the current image is re-initialised to the value "good pixel". Moreover, during step 16, the variable $N_{RS}^{(x,y)}$ and the variable $N_{pixel(x,y)}$, which is explained hereinafter in relation to FIGS. 3A and 3B, are re-initialised to the value "0". In a step 17 following step 16, the variable $n_i$ takes the value "0". Step 17 is followed by step 10, already explained, during which a new image is processed by the image-processing module 52. If the variable $n_i$ is less than $N_4$, the image-processing module 52 returns to step 10 in order to process a new image.

In one embodiment, the number of images $N_4$ takes the value 25, corresponding to one second of a sequence of images acquired with an image frequency of 25 images per second.

Figure 2:
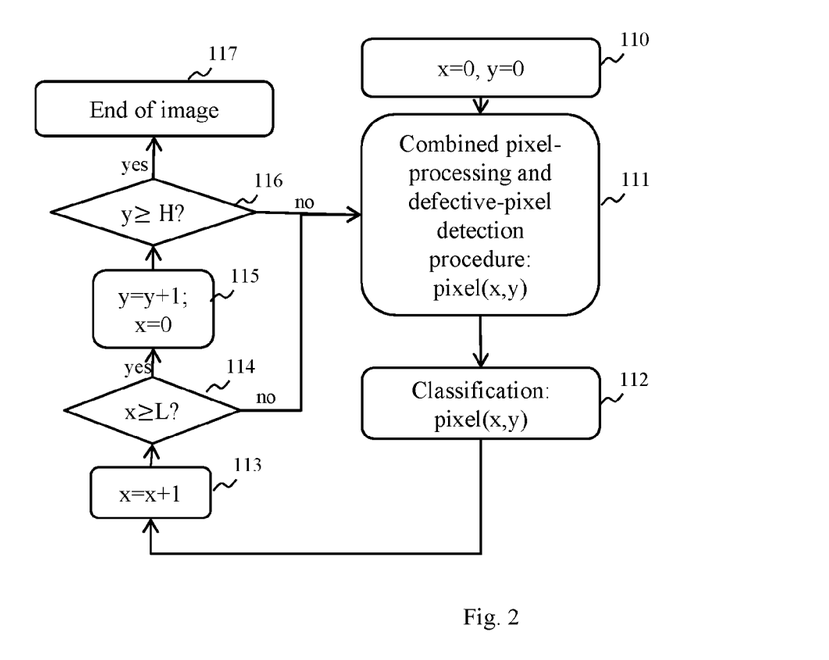
FIG. 2 depicts schematically an example of an image-processing procedure able to implement the invention, used by said image-processing module.

FIG. 2 depicts schematically an example of an image-processing procedure able to implement the invention, used by the image-processing module 52. The image-processing procedure corresponds to step 11. In a step 110, a variable x and a variable y used for running through the pixels in the current image are initialised to the value "0". The variable x is a horizontal coordinate of a pixel. The variable y is a vertical coordinate of a pixel.

In a step 111, a pixel situated at a position indicated by the variables x and y, called pixel(x,y), is processed by a combined pixel-processing and defective-pixel detection procedure that is explained hereinafter in relation to FIG. 3A. During the combined pixel-processing and defective-pixel detection procedure, the classification value associated with the pixel pixel(x,y) is modified, if necessary, according to at least one result of implementation of at least one pixel-processing procedure.

In a step 112, a pixel-classification procedure, which is described hereinafter in relation to FIG. 3B, is applied by the image-processing module 52. The classification procedure allows to determine the classification value to be associated with the pixel pixel(x,y).

In a step 113, the variable x is incremented by one unit. In a step 114, the variable x is compared with a value L representing a number of pixels in a row of the current image. If the variable x is less than the value L, the image-processing module returns to step 111 in order to continue the processing of the current image.

If the variable x is greater than or equal to the value L, during a step 115 the variable x is set to the value"0" and the variable y is incremented by one unit in order to pass to a following row in the current image. In a step 116, the variable y is compared with a value H representing a number of pixels per column of the current image. If the variable y is greater than the value H, the processing of the current image ends during a step 117. If the variable y is lower than the value H, the processing of the current image continues during step 111.

FIG. 3A illustrates schematically an example of a combined pixel-processing and defective-pixel detection procedure included in the image-processing procedure able to implement the invention. The combined pixel-processing and defective-pixel detection procedure corresponds to step 111. The combined pixel-processing and defective-pixel procedure is implemented conjointly by the pixel-processing module 521 and the defective-pixel detection module 522.

In a step 1110 the pixel-processing module 521 obtains a pixel pixel(x,y).

In a step 1111, the pixel processing module 521 applies at least one pixel-processing procedure to the pixel pixel(x,y). For example the pixel-processing module 521 filters the pixel pixel(x,y) in order to attenuate or eliminate any acquisition noise in the current image and/or filters the pixel pixel(x,y) in order to improve contours of objects in the current image and/or applies to the pixel pixel(x,y) an optical-flow method for determining a movement of the pixel.

In a step 1112, the defective-pixel detection module 522 analyses at least one result supplied by the pixel-processing module 521 in order to detect an unusual result. The defective-pixel detection module 522 therefore does not implement any new processing operations on the current image in order to determine whether a pixel is defective, but uses results of processing operations implemented by the pixel-processing module 521. In this way synergy is created between the pixel-processing module 521 and the defective-pixel detection module 522. This synergy allows to reduce the computing cost of the detection of defective pixels.

An unusual result is a result that it is improbable to obtain during a processing of a natural image. An unusual result may therefore represent a defect on a photosite of the image sensor that supplied the pixel pixel(x,y).

In the case of a filtering, an unusual result is a filtering value obtained after filtering of the pixel pixel(x,y) that is very different from filtering values of pixels adjacent to the pixel pixel(x,y). Let $\overline{pixel(x,y)}$ be the value obtained after filtering of the pixel pixel(x,y). The detection of an unusual result consists, for example, of comparing a difference between the value $\overline{pixel(x,y)}$ and the filtered value of the pixels adjacent to the pixel pixel(x,y) to within a predefined difference threshold. When the difference is greater than the predefined threshold, it is considered that the value $\overline{pixel(x,y)}$ is an unusual result. An adjacent pixel may be a spatially adjacent pixel belonging to the current image or a temporally adjacent pixel situated at the same spatial position as the pixel pixel(x,y) in a previous image.

In the case of a use of an optical-flow method, an unusual result consists of obtaining an immobile pixel, i.e. the pixel pixel(x,y) is associated with movement information indicating that the pixel has no movement.

In one embodiment, a plurality of results of the pixel-processing module 521 are combined in order to determine whether, overall the pixel-processing module 522 has given an unusual result. For example, a result from the pixel-processing module 522 is considered to be unusual if the pixel pixel(x,y) is associated with movement information indicating that the pixel has no movement and that the value $\overline{pixel(x,y)}$ is very different from the filtered values of the pixels adjacent to the pixel pixel(x,y).

If no unusual result is detected, the combined pixel-processing and defective-pixel detection procedure ends during a step 1116, which is followed by step 112. The pixel then keeps its previous classification value.

If an unusual result is detected during step 1112, the defective-pixel detection module 522, in a step 1113, increments the variable $N_{RS}^{(x,y)}$ associated with the pixel pixel(x, y) by one unit. The variable $N_{RS}^{(x,y)}$ is used to count a number of detections of an unusual result for the pixel pixel(x,y).

In a step 1114, the variable $N_{RS}^{(x,y)}$ is compared with an unusual-result detection threshold $N_1$ representing a maximum allowable number of unusual results for a pixel beyond which it is considered that the pixel is defective. By using the variable $N_{RS}^{(x,y)}$ and the unusual result detection threshold $N_1$, the pixel-detection module 522 monitors a detection reactiveness of the combined pixel-processing and defective-pixel detection procedure. A single detection of an unusual result for a pixel does not necessarily mean that the pixel is defective. This is because it is possible for the current image to supply pixel values leading to unusual results even if no defective pixel is present in the current image. On the other hand, the detection of a plurality of unusual results for the same pixel on a number of images corresponding to a sufficiently long period of time has a very high probability of having been caused by a defective photosite of the image sensor 510. For example, a photosite of the image sensor 510 producing pixels leading systematically to a filtering value very different from filtering values of adjacent pixels on a plurality of images, has very high chances of being defective. Likewise, a photosite of the image sensor producing pixels that remain immobile over a plurality of images, whereas pixels adjacent to these pixels have a movement, can reasonably be considered to be defective.

If for the pixel pixel(x,y) the variable $N_{RS}^{(x,y)}$ is lower than the unusual-result, detection threshold $N_1$, the combined pixel-processing a defective-pixel detection procedure ends during step 1116, which is followed by step 112. The pixel pixel(x,y) keeps the previous classification value.

If, on the other and, for the pixel pixel(x,y) the variable $N_{RS}^{(x,y)}$ is higher than the unusual-result detection threshold $N_1$, during a step 1115 a variable $S_{pixel(x,y)}$ representing the classification value associated with the pixel pixel(x,y) takes the value "first detection" indicating that the pixel pixel(x,y) has just given an unusual value and that the photosite of the image sensor 510 is defective and is supplying a defective pixel. Step 1115 is followed by step 1116, already explained.

In one embodiment, the unusual result detection threshold $N_1$ is a maximum acceptable number of successive detections of an unusual result for a pixel pixel(x,y).

In one embodiment the unusual-result detection threshold $N_1$ takes the value "1", i.e. a pixel pixel(x,y) is declared to be defective if the defective-pixel detection module 522 detects an unusual result for the pixel pixel(x,y) in an image. This embodiment is highly reactive.

In one embodiment the unusual-result detection threshold $N_1$ takes the value "16", i.e. a pixel pixel(x,y) is declared defective if the defective-pixel detection module 522 detects 16 unusual results for the pixel pixel(x,y) in 16 successive images. This embodiment allows to detect a defective pixel with a low probability of error.

In one embodiment, the unusual-result detection threshold $N_1$ is a maximum acceptable number of detections of an unusual result for a pixel pixel(x,y) over a period of time corresponding to a number of images $N_2$ equal to a threshold. For example, the unusual-result detection threshold $N_1$ takes the value "16" and the number of images $N_2$ takes the value "20", i.e. a pixel pixel(x,y) is declared defective if the defective-pixel detection module 522 detects 16 unusual results for the pixel pixel(x,y) in a set of 20 successive images.

FIG. 3B depicts schematically an example of a pixel-classification procedure included in an image-processing procedure able to implement the invention. The classification procedure is implemented by the defective-pixel detection module 522 and corresponds to step 112. The classification procedure has two objectives: it allows firstly to update the classification value of each defective pixel, and secondly to monitor how much time a pixel corresponding to a photosite of the image sensor 510 that has been detected as defective must continue to be considered to be defective. It is considered in fact that a photosite of the image sensor 510 that has been detected as defective has a high probability of being in an unstable state. Consequently, even if no unusual result has been found for a pixel corresponding to this photosite of the image sensor 510, it is preferable to wait for a certain number of images before considering that the photosite of the image sensor 510 is once again functioning correctly. The variable $S_{pixel(x,y)}$ associated with the pixel pixel(x,y) therefore does not take the value "good pixel" as soon as an non-unusual result is obtained for the pixel pixel(x,y), but waits until a non-unusual result is obtained for the pixel pixel(x,y) for a period of time corresponding to a number of successive images equal to a threshold $N_3$. In one embodiment $N_3=N_4$.

In a step 1120, the defective-pixel detection module checks the value of the variable $S_{pixel(x,y)}$. If the variable $S_{pixel(x,y)}$ is equal to the value "first detection", step 1120 is followed by a step 1125 during which the variable $N_{pixel(x,y)}$ takes the value of the threshold $N_3$. The variable $N_{pixel(x,y)}$ allows to count how many times a processing performed on the pixel pixel(x,y) by the pixel-processing module 521 has given a non-unusual result.

In a step 1126, the defective-pixel detection module 522 sets the classification value $S_{pixel(x,y)}$ associated with the pixel pixel(x,y) to the value "defective pixel".

Step 1126 is followed by a step 1127 that ends the pixel-classification procedure and is followed by step 12.

If the variable $S_{pixel(x,y)}$ is not equal to the value "first detection", step 1120 is followed by a step 1121.

During a step 1121, the defective-pixel detection module 522 determines whether the variable $S_{pixel(x,y)}$ is equal to the value "defective pixel". A pixel associated with the classification value "defective pixel" during step 1121 is a pixel for which a non-unusual result has been obtained for the current image, but supplied by a photosite of the image sensor 510 for which at least one unusual result has been obtained in an image included in the $N_3$ images preceding the current image. If the variable $S_{pixel(x,y)}$ is not equal to the value "defective pixel", step 1121 is followed by step 1127 already explained, which is followed by step 12.

If the variable $S_{pixel(x,y)}$ is equal to the value "defective pixel", step 1121 is followed by step 1122, during which the variable $N_{pixel(x,y)}$ is decremented by one unit.

In a step 1123, the variable $N_{pixel(x,y)}$ is compared with the value "0". If the variable $N_{pixel(x,y)}$ is at the value "0", the classification value $S_{pixel(x,y)}$ is set to the value "good pixel", indicating that the photosite of the image sensor 510 that supplied the pixel is considered to be functioning correctly. Step 1124 is followed by step 1127, which is followed by step 12.

Step 1123 is followed by step 1127 when the variable $N_{pixel(x,y)}$ is at the value "0".

FIG. 4 depicts schematically an example of a results-synthesis procedure for implementing the image-processing procedure able to implement the invention. The results-synthesis procedure for implementing the image-processing procedure corresponds to step 12. During the results-synthesis procedure for implementing the image-processing procedure, the defective-pixel detection module 522 determines a reliability level for each intermediate output data item of the image-processing module 52 according to the classification value associated with each pixel involved in a result of a pixel-processing procedure allowing to obtain said intermediate output data item.

In a step 120, the defective-pixel detection module obtains the classification value $S_{pixel(x,y)}$ associated with each pixel pixel(x,y) of the current image. In a step 121, the variables x and y used for travelling through the pixels of the current image are initialised to the value "0".

In a step 122, each intermediate output data item of the image-processing module 52 is initialised to a reliability level equal to a maximum-reliability level C.

In a step 123 the defective-pixel detection module determines whether the pixel pixel(x,y) is associated with a classification value equal to the value "defective pixel".

If the pixel pixel(x,y) is associated with a classification value equal to the value "defective pixel", step 123 is followed by step 124.

During step 124, the defective-pixel detection module 522 runs through a set comprising each intermediate output data item obtained from a processing implemented by the image-processing module 52 in order to determine the reliability level of each intermediate output data item. For each intermediate output data item, the defective-pixel detection module 522 determines whether this intermediate output data item depends on the pixel pixel(x,y). If the intermediate output data item depends on the pixel pixel(x,y), the reliability level associated with this intermediate output data item is decreased for example by dividing it by two.

In one embodiment, the intermediate output data item is a pixel issuing from a filtering by the pixel-processing module 521, referred to as a filtered pixel. The filtered pixel is generally obtained by the convolution of pixels of an image issuing from the image sensor with a convolution kernel representing a filter. The convolution kernel is in general a matrix with one or two dimensions. The convolution involves the pixel to be filtered and pixels in the vicinity of the pixel to be filtered. If, among the pixels involved in the filtering, a pixel is considered to be defective, the reliability level of the corresponding intermediate output data item is reduced.

In one embodiment, when an intermediate output data item comprises coordinates of an object being followed and movement information on the object being followed, the intermediate output data item is in general obtained by combining movement information associated with pixels contained in the object being followed, said information having been obtained by the pixel-processing module 521. If, among the combined movement information, at least one item of information is associated with a defective pixel, the reliability level of the corresponding intermediate output data item is reduced.

An intermediate output data item associated with a reliability level lower than the maximum reliability level C indicates that at least one defective pixel has been used to obtain the intermediate output data item.

Step 124, and step 123 when the variable $S_{pixel(x,y)}$ is not equal to the value "defective pixel", are followed by steps 125 to 129 respectively identical to steps 112 to 116.

The procedure for synthesising the results of implementation of the image-processing procedure then supplies intermediate output data each associated with a reliability level modulated by taking into account any dependency vis-à-vis defective pixels. These intermediate output data are next used during step 13 to determine final output data.

The invention claimed is:

1. A method for detecting defective pixels included in an image-processing procedure comprising a pixel-processing procedure, the pixel-processing procedure being applied to pixels of at least one image issuing from an image sensor, each pixel corresponding to an active element of the image sensor, referred to as a photosite, able to convert an incident light beam into an electrical signal, each pixel being associated with a classification value representing a state of said pixel, wherein the method comprises:
applying a combined pixel-processing and defective-pixel detection procedure to each pixel of an image, comprising, for each pixel,
applying the pixel-processing procedure to said pixel, the pixel-processing procedure supplying, when it is applied to pixels of said image, pixels of said image issuing from filterings intended to attenuate an acquisition noise and/or to improve and/or detect contours in said image and/or information representing an object detected and followed in said image;
analysing results of the filterings intended to attenuate the acquisition noise and/or to improve and/or detect contours in said image and/or information representing object detected and followed in said image supplied by the pixel-processing procedure;
in the event of one of the results being an unusual result representing a defect on a photosite of the image sensor that supplied said pixel, incrementing a variable representing a number of detections of an unusual result for said pixel; and
associating said pixel with a classification value representing a defective pixel when said variable reaches a first threshold representing a maximum number of unusual results.

2. The method according to claim 1, wherein the method is applied to a sequence of successive images issuing from the image sensor and in that the first threshold is a maximum number of unusual results acceptable over a period of time corresponding to a number of images equal to a second threshold.

3. The method according to claim 1, wherein, when a pixel of a first image is associated with a classification value representing a defective pixel, said pixel is considered to be defective as long as the pixel-processing procedure does not, for said pixel, give a non-unusual result, not representing a defect on a photosite of the image sensor that supplied said pixel, during a period of time corresponding to a number of successive images equal to a third threshold.

4. The method according to claim 1, wherein a procedure of periodic re-initialisation to a classification value representing a non-defective pixel is applied to the classification value associated with each pixel, the periodic re-initialisation taking place with a predefined period corresponding to a number of images equal to a fourth threshold.

5. A method for determining a reliability level of at least one data item output from an image processing procedure, each output data item being obtained from at least one result of a pixel-processing procedure included in the image-processing procedure, wherein the method comprises:
applying the defective-pixel detection method according to claim 1; and
determining the reliability level of each output data item according to the classification value associated with each pixel involved in a result of the pixel-processing procedure allowing to obtain said output data item.

6. The method according to claim 5, wherein the method further comprises, for each output data item, deciding to use or replace said output data item according to the reliability level of said output data item, an output data item being used for a display of said output data item and/or saving of said output data item and/or triggering of an alarm corresponding to said output data item.

7. A device able to detect defective pixels included in an image-processing device comprising a pixel-processing module able to process pixels of at least one image issuing from an image sensor, each pixel corresponding to an active element of the image sensor, referred to as a photosite, able to convert an incident light beam into an electrical signal, wherein said device able to detect defective pixels and is configured for:
obtaining a result of a use of the pixel-processing module on a pixel, the pixel-processing procedure providing, when it is applied to pixels of an image, pixels of said image issuing from filterings intended to attenuate an acquisition noise and/or to improve and/or to detect contours in said image and/or information representing an object detected and followed in said image;
identifying an unusual result of the filterings intended to attenuate the acquisition noise and/or to improve and/or detect contours in said image and/or information representing object detected and followed in said image from the image-processing module, representing a defect on a photosite of the image sensor that supplied a pixel;
incrementing a read variable representing a number of unusual results obtained for a pixel; and
associating a pixel with a classification value representing a defective pixel when said variable reaches a first threshold representing an acceptable maximum number of unusual results.

8. An image-processing device comprising a pixel-processing module able to process pixels of at least one image that come from an image sensor and a device according to claim 7.

9. An optronic system comprising an image-acquisition system provided with an image sensor, an image-processing device according to claim 8 and an image-display and/or image-storage device.

10. A non transitory readable medium containing computer instructions that, when executed by a device, performs the method according to claim 1 by a processor of said device.

11. A storage unit, wherein it stores a computer program containing instructions for the implementation, by a device, of the method according to claim 1 when said program is executed by a processor of said device.

12. A method for detecting defective pixels included in an image-processing procedure comprising a pixel-processing procedure, the pixel-processing procedure being applied to pixels of at least one image issuing from an image sensor, each pixel corresponding to an active element of the image sensor, referred to as a photosite, able to convert an incident light beam into an electrical signal, each pixel being associated with a classification value representing a state of said pixel, wherein the method comprises:

applying a combined pixel-processing and defective-pixel detection procedure to each pixel of an image, comprising, for each pixel, applying the pixel-processing procedure to said pixel, the pixel-processing procedure supplying, when it is applied to pixels of said image, pixels of said image issuing from filterings intended to attenuate an acquisition noise and/or to improve and/or detect contours in said image and/or information representing an object detected and followed in said image;

analysing a result supplied by the pixel-processing procedure;

in the event of obtaining an unusual result representing a defect on a photosite of the image sensor that supplied said pixel, incrementing a variable representing a number of detections of an unusual result for said pixel; and associating said pixel with a classification value representing a defective pixel when said variable reaches a first threshold representing a maximum number of unusual results, wherein, when a pixel of a first image is associated with a classification value representing a defective pixel, said pixel is considered to be defective as long as the pixel-processing procedure does not, for said pixel, give a non-unusual result, not representing a defect on a photosite of the image sensor that supplied said pixel, during a period of time corresponding to a number of successive images equal to a third threshold.

* * * * *